2,790,712
PROCESS FOR REFINING IRON

Henk Henrichs, Duisburg, Germany, assignor to Mannesmann Aktiengesellschaft, Dusseldorf, Germany, a corporation of Germany No Drawing. Application April 26, 1955,
Serial No. 504,113

8 Claims. (Cl. 75—51)

This invention relates to processes for refining iron and it relates particularly to the conversion of iron to steel in the presence of fluxing and slag-forming materials of unique type.

It is customary when refining iron, such as pig iron, for instance by the Thomas process, by blowing through the bottom with air, or air enriched with oxygen to add iron ore, scrap iron, lime, limestone and other reagents, to form a slag in which impurities in the iron, such as phosphorous and the like are collected and removed. These materials are used also to regulate the temperature of the melt to control the removal of impurities. For example, phosphorous it removed more readily and completely when the slag temperature is maintained slightly below the temperature of the molten metal, as for example, by adding iron ore, lime or limestone to the converter periodically during the blowing operation.

While the above-mentioned fluxing and slagforming ingredients are effective and satisfactory, they are not inexpensive and add considerably to the cost of refining of the iron. Moreover, iron scrap sometimes is in short supply and at least indirectly controls production rates.

In accordance with the present invention, a new slag-forming and fluxing material has been discovered which can be used to replace ore and scrap iron in substantial proportion and to provide other slag-forming and fluxing ingredients.

More particularly, the invention comprises the refining of iron by the Thomas process including blowing the impure iron with air or oxygen-enriched air through the bottom in the presence of a slag containing "red mud," a waste byproduct of the recovery of alumina from bauxite in the manufacture of aluminum.

Red mud has about the following composition:

| | Percent |
|---|---|
| Moisture | 40 |
| $Fe_2O_3$ | 32 |
| $Al_2O_3$ | 12 |
| Water of crystallization | 4 |
| $SiO_2$ | 2.5 |
| $TiO_2$ | 4.0 |
| $Na_2O$ | 2.0 |
| $CaO$ | 1.0 | and small amounts or traces of $MgO$, $SO_3$, $V_2O_5$ and other impurities.

Inasmuch as the aluminum industry and the steel industry are not very closely related, it is not surprising that a waste product of the aluminum industry would not appear to have any utility in the steel industry. However, by this invention, not only can this waste product be disposed of but actual savings in production costs can be obtained through its use as an iron containing fluxing material and slag component to replace, at least in part, the more costly ore and scrap heretofore needed in the refining operation.

Red mud can be introduced into the converter before the start of the blowing operation, and during the blowing operation. When it is added prior to blowing, it is preferably in a dried, porous lumpy form. Surprisingly, in this form the red mud does not cause foaming during the decarburization period so that no special precautions are required to reduce foaming, which causes metal and slag losses by slopping.

When the red mud is added during the blowing operation to control temperature and composition, it preferably is added in briquette or sintered lumpy form. The briquettes can be formed by mixing red mud with suitable binding agents such as pitch, tar and the like and other refining agents such as lime, limestone and iron ore can be added to regulate the composition as may be found desirable.

The sintering of the red mud may be carried out in revolving furnaces or on a Dwight-Lloyd-sinterband likewise combined with lime, limestone and iron-ore or other refining agents.

The amount of red mud added to the converter may vary considerably but it has been added with beneficial results in an amount between about 36 and 110 pounds per ton of pig iron in the charge. Thus, for a 25 ton charge, in a basic lined converter which is blown through the bottom with oxygen-enriched air, containing about 30 to 40% of oxygen, red mud in an amount between about 900 pounds and 2750 pounds is added.

In a typical operation, about 1000 pounds of red mud on a dry basis and in a lumpy form together with about 4000 lbs. of iron scrap and 6000 lbs. of burned lime are added to a converter containing 25 tons of molten pig iron having a composition about as follows:

| | Percent |
|---|---|
| Carbon | 3.5 |
| Silicon | 0.4 |
| Manganese | 1.0 |
| Phosphorous | 2.00 |
| Sulfur | 0.05 |
| Nitrogen | 0.007 |

Bottom-blowing is then started with usual air. After about 2 minutes the air is enriched up to about 30% of oxygen and after another 6 minutes i. e. about 2 minutes before the carbon-flame collapses, sintered red mud is added during the blowing in quantities up to 1750 pounds.

At the end about of the twelfth minute, when the desired phophorous content of the steel is reached, the blowing it stopped and the steel may be discharged into ladles after being slagged off.

The slag derived from the refining operation is of higher commercial value inasmuch as it contains more citrate-soluble phosphoric acid that a usual Thomas-slag and can be used as a fertilizer.

It will be understood that the manner in which the red mud is added to the converter and the amount added is dependent on the composition of the molten metal and the treatment of the metal, and that the example given herein is illustrative of a typical but non-limiting process.

Furthermore the beneficial use of red mud is possible in any modified Thomas-process, such as for instance the surface-blowing treatment of Thomas-pig-iron with substantially pure oxygen. Moreover the use of red mud is helpful as a slopping-preventing addition in the acid Bessemer-process.

I claim:

1. A method of refining iron comprising blowing a charge of molten iron in a converter with an oxygen-containing gas in the presence of a slag and flux containing red mud.

2. A method of refining iron comprising introducing a charge of molten pig iron into a converter, adding to the converter slag-forming and fluxing ingredients including red mud in dry, lumpy form and blowing the charge with an oxygen-containing gas to remove impurities from the charge.

3. The method set forth in claim 2 comprising adding briquettes of red mud or red mud in sintered lumpy-form periodically to the converter during blowing of the charge.

4. The method set forth in claim 3 in which the quantity of red mud added to the converter is between about 30 and 110 pounds per ton of molten pig iron.

5. The method set forth in claim 2 comprising adding to the converter during blowing of the charge briquettes of red mud containing limestone, iron ore and a binder.

6. The method set forth in claim 2 comprising adding to the converter before or during blowing of the charge red mud in sintered lumpy-form containing lime, limestone or iron ore.

7. The method set forth in claim 1 comprising the use of substantially pure oxygen blown on the surface of the melt.

8. The method comprising the step of adding red mud as a slopping-preventing addition in the acid Bessemer-process.

References Cited in the file of this patent

UNITED STATES PATENTS

| | | |
|---|---|---|
| 2,147,206 | Lemoine | Feb. 14, 1939 |
| 2,416,179 | Kemmer | Feb. 18, 1947 |

FOREIGN PATENTS

| | | |
|---|---|---|
| 105,521 | Australia | Oct. 14, 1938 |